United States Patent [19]

Geiges, Jr.

[11] Patent Number: 4,524,541

[45] Date of Patent: Jun. 25, 1985

[54] BLOOMING PLANT IMPLANT WITH MESSAGE HOLDER

[76] Inventor: Albert F. Geiges, Jr., 3157 Mechanicsville Rd., Bensalem, Pa. 19020

[21] Appl. No.: 587,448

[22] Filed: Mar. 8, 1984

Related U.S. Application Data

[63] Continuation-in-part of Ser. No. 502,291, Jun. 8, 1983.

[51] Int. Cl.³ .......... A01B 79/00

[52] U.S. Cl. .......... 47/58

[58] Field of Search .......... 47/58, 41, 55

[56] References Cited

U.S. PATENT DOCUMENTS

| | | | |
|---|---|---|---|
| 471,181 | 4/1892 | Laun | 47/41 X |
| 1,533,131 | 4/1925 | Muller | 47/55 X |
| 3,955,321 | 5/1976 | Payton | 47/58 |

*Primary Examiner*—Robert A. Hafer

*Assistant Examiner*—Danton D. DeMille

*Attorney, Agent, or Firm*—Vorys, Sater, Seymour & Pease

[57] ABSTRACT

A method and system for implanting a message within a blooming plant includes removing a plug from the base portion of a plant bud to form a channel therein through which a message holder with a message is implanted within a central portion of the plant. The plug is replaced and sealed with grafting wax. Upon subsequent blooming of the plant, a signal of the message holder is displayed to open sight, whereby the message holder with message is removed. The message holder includes a receptacle, a signal rod, a signal and a plurality of semi-flexible one way anchor pods. The pods keep the message holder from subsequently popping out of the channel.

6 Claims, 6 Drawing Figures

BLOOMING PLANT IMPLANT WITH MESSAGE HOLDER

RELATED PATENT APPLICATIONS

This application is a continuation-in-part of copending U.S. patent application Ser. No. 502,291, filed on June 8, 1983 by applicant herein, entitled "Blooming Plant Implant".

BACKGROUND OF THE INVENTION

1. Field of the Invention

This invention relates generally to a method for implanting a message within a blooming plant with a novel message holder, as well as to a plant modified by such method. More particularly, this invention concerns the removal of a plug from the base portion of a plant bud thereby forming a channel through which a message may be implanted within the plant, and implanting therein a message contained in a novel message holder.

2. Description of the Prior Art

In the field of blooming plants and in the commercial marketing of blooming plants such as roses, a long standing drawback has been the relatively anti-climactic effect on the recipient of a bouquet or arrangement of blooming plants or flowers once the initial pleasure or satisfaction experienced during the presentation of the gift has expired. That is, the typical recipient of a bouquet or arrangement of blooming flowers quickly looses interest in such gift thereby decreasing their perceived overall value as a gift.

One attempt to increase one's interest in a growing plant is disclosed by Payton in U.S. Pat. No. 3,955,321, wherein a plug is withdrawn from the wall of a living pumpkin while still attached to its vine. A plastic bag is then introduced into the hole formed upon removal of the plug and an object is inserted into the bag whereupon the bag is tied and pushed entirely into the pumpkin. The plug is then replaced and the pumpkin is grown to maturity and subsequently harvested at which time the foreign object, which may be a gift such as currency, will be discovered. While such method may be applicable to plants such as pumpkins or gourds, a need still exists for increasing the interest and anticipation of a recipient of a bouquet or arrangement of blooming plants such as roses.

SUMMARY OF THE INVENTION

Accordingly, this invention has been made to overcome the problems described above, and therefore has an object to provide a method for implanting a message within blooming plants and flowers so as to increase the interest and appreciation of the recipient of such plants and to create a sense of excitement or anticipation in such recipients.

The above and other objects are achieved according to the present invention by the provision of a method for implanting a message within a living plant in the bud stage of its development using a particular type of message holder. As the bud slowly opens, the message is "announced" by a pop-up type of signal with which the message is removed. The anticipation that a message is forthcoming enhances, augments and sustains the initial pleasure of the recipient of such plant modified in accordance with the invention.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein.

DETAILED DESCRIPTION OF THE PREFERRED EMBODIMENT

Figure 1:
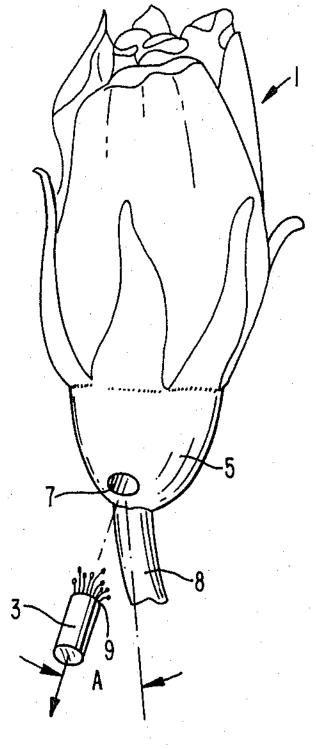
FIG. 1 is a front perspective view of a flower bud showing the removal of a plug from the base section thereof.

The method and assembly in accordance with the present invention will now be described in conjunction with the acompanying FIG. 1, within which, for example, a blooming or flowering plant 1 is disclosed. The bud or blossom 1 is typically a bud of a flowering plant such as typically provided within a bouquet or flower/arrangement such as a rose bud. While roses are most readily adaptable to the method of the present invention, tulips and other flowers will be readily adaptable to the method of the present invention as well. While the invention is primarily directed to cut flowers, potted plants or rooted garden plants may also be so modified.

The first step in the implant process is to remove a plug member 3 from the base portion or receptacle 5 of a blooming plant so as to temporarily form a channel 7 therein. Any rigid channel member having relatively thin walls may be used to remove the plug 3. For example, a rigid plastic straw or a thin walled pipe may be used to remove plug 3. The outer diameter of the straw or channel member should be on the order of approximately one quarter inch so as to form channel 7 with a corresponding diameter. The channel member is simply pushed through the base portion 5 of the bud 1 such that plug 3 becomes wedged within the channel member and is removed from base portion 5 upon removal of the channel member.

When removing the plug 3 from base 5 of bud 1 it has been found preferable to limit the angle formed by the axis of channel 7 with respect to the axis of the stem 8 of bud 1 to an arc A of less than 30°. In addition, the plug 3, shown as a tubular plug in FIG. 1, should be removed in a manner such that the channel 7 communicates with the interior hollow portion of the bud 1. That is, channel 7 should be bored in a manner which results in the opening of such channel into the interior portion of the bud at a point near the center of the bud and preferably at a point within the natural internal cavity defined by the plurality of petals of the bud 1. Typically, channel 7 will have an axial length ranging between ½ and 1 inch. A good indication of a properly bored channel is the existence of a portion of the reproductive organ 9 of the bud 1 upon the inner end portion of the plug 3 upon removal of the plug from the bud. The presence of such reproductive organ 9 indicates that access to an internal chamber defined by the petals of the bud 1 has been effected. Access to this chamber is preferred for the proper implantation of a message therein.

Figure 2:
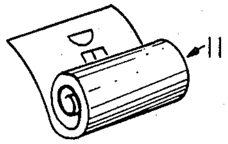
FIG. 2 is a perspective view of a message in scroll form suitable for holder implant within the bud of FIG. 1.

As shown in FIG. 2, message or object 11 may be formed of a scrolled cylindrical paper or plastic miniature document, although the message or object may take the form of a man-made object or gift such as a diamond wrapped in tissue paper of the like. If desired, the message or gift may be encapsulated and the capsule inserted into the holder discussed below, although encapsulation is not an essential aspect of this invention.

Figure 3:
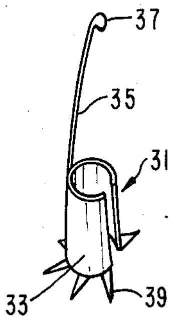
FIGS. 3 and 4 are exploded perspective views of a message holder for implant within the bud of FIG. 1.
Figure 4:
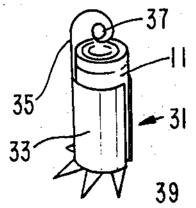

FIGS. 3 and 4 show exploded views of a message holder or signal device 31, illustrating an opened and a closed signal rod, respectively. Message holder 31 includes receptacle or retainer 33 (in this case shown as a cut cylinder), semi-flexible one way anchor pods 39, flexible signal member rod 35 and signal 37. FIG. 4 shows scroll 11 positioned within receptacle 33.

The receptacle 33 portion may be cylindrical as shown, with or without the cut, or may be of any other convenient configuration which will receive and hold a message. Likewise rod 35 may be of any functional "pop-up" design and signal 37 may be a sphere, as shown, or a triangle, cube or any other shape which is adequately visible to signal the availabilty of the message holder with message, and adequately designed to enhance or at least not hinder the removal of message holder 31 from the plant. The message holder 31 may be constructed of plastic or metal or a combination of materials, although it may preferably be constructed as a single plastic structure, i.e., is of uni-body plastic construction.

Figure 5:
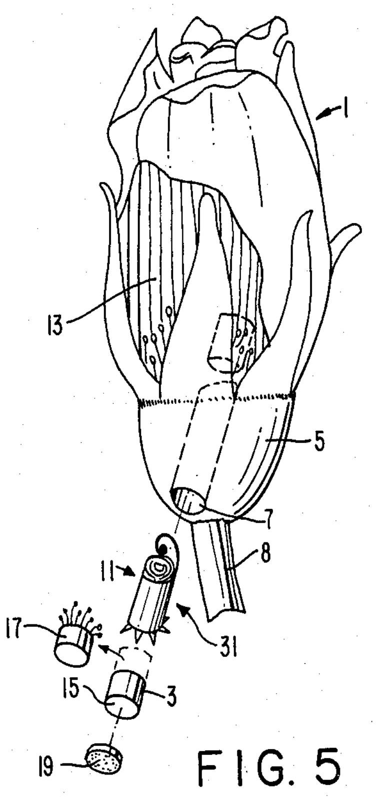
FIG. 5 is a front perspective view of the bud of FIG. 1 showing the relative placement of the components of the invention, including the message holder of FIG. 4; and, FIG. 6 is a perspective plan view of the bud of FIG. 1 showing the message holder of FIGS. 4 and 5 disposed therein blooming.

As shown in FIG. 5, message 11, such as a scrolled message, contained within message holder 31, is inserted within channel 7 and pushed therethrough until it has gained access to cavity or chamber 13 within the bud or blossom 1 so as to be removed from open sight. That is, object 11 is placed to lie above receptacle 5 so as to be surrounded by the petals of blossom 1. Semi-flexible one way anchor pods 39 enable easy insertion by folding in during insertion and then opening up after insertion so as to anchor message holder 31 from being pushed back out through channel 7 during blooming. Any suitable object may be used as a ramrod for pushing the message holder 31 with message 11 through channel 7, such as a dowel pin member having a diameter less than that of channel 7.

After implanting the message holder 31 with message 11 within the cavity 13, the plug 3 is removed from the channel member with, for example, a pin and reinserted within channel 7 such that the outer surface 15 of the plug 3 is returned to its original relative position with respect to the base 5 of bud 1, that is, flush with the surface of base 5. Should the bud 1 be of relatively small dimensions, an axial end portion 17 of the inner end of plug 3 may be removed so as to provide additional room within the bud 1 for the message holder. Once the plug 3 has been reinserted to its original natural position, a surface coating 19 may be applied over the incision defining the outer boundaries of channel 7. The coating 19 may be a grafting wax or simply a melted candle wax provided for the purpose of minimizing the trauma to the bud 1 caused by the implant.

Figure 6:
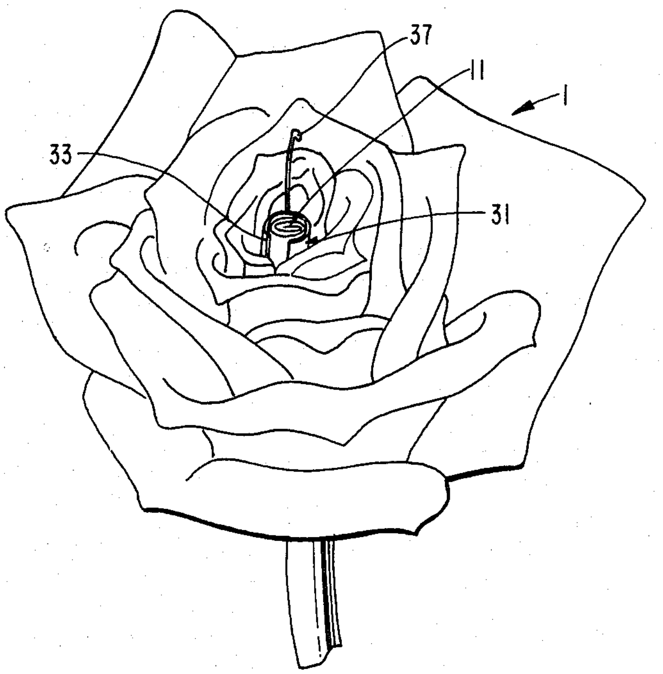

FIG. 6 shows the final results of the implant method wherein message holder 31 with message 11 is displayed within the central portion of the bud 1 after it has bloomed. (The amount of protrusion of message holder 31 and signal 37 is exaggerated for illustrative purposes.) It can be appreciated that one receiving a bud such as shown in FIG. 1 and modified in accordance with the method set forth above, would, upon being told of the message (or gift) implanted therein typically experience greater interest in such plant than a plant not so modified. Moreover, in addition to the increase in initial pleasure of receiving such modified plant, the interest of the recipient would typically be increased and sustained as a result of the anticipation created by the expectation of receiving a message upon blooming of the bud. This period may vary from a day to week, depending upon the stage of development of the bud and the type of blooming plant used. Moreover, blooming times for various plants modified in accordance with the invention may readily be determined such that the message or gift will be displayed to open sight upon a predetermined date.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for implanting an object within a blossom capable of blooming, said blossom having a receptacle and a plurality of petals and said object provided with a signal device adapted to provide a signal for indicating the presence of said object, and wherein said method comprises:

removing a plug member from said plant so as to form a channel leading into an interior portion of said blossom;

placing said object within said signal device so as to retain said object therein;

inserting said signal device and said object retained therein through said channel into said interior portion of said blossom such that said object is removed from open sight; and replacing said plug member within said channel whereby upon opening of the blossom the signaling device signals the presence of the object.

2. The method of claim 1 which further comprises applying a protective coating over said plug member after said replacing said plug member.

3. An article of commerce comprising:

a living blossom not fully opened;

a man-made object disposed within said blossom such that said object is hidden from view by unopened petals of said blossom; and signal means disposed within said blossom for providing a signal indicating the presence of said object within said blossom upon opening of said petals.

4. The article of claim 3 wherein said signal means comprises retaining means for retaining and holding said object within said blossom, and a signal rod connected to said retaining means such that upon opening of said petals said signal rod is exposed to sight.

5. The article of claim 4 wherein said signal means further comprises a signal member disposed on said signal rod for providing a clear signal of the presence of said object within said blossom.

6. The article of claim 5 wherein said signal rod is adapted to project from a first end portion of said retaining means and wherein said signal means further comprises anchor means projecting from a second end portion of said retainer for anchoring said signal means and said object within said blossom.

* * * * *